Sept. 18, 1962   K. H. SCHÜTZ   3,054,336
EXPOSURE-CONTROL SYSTEM FOR PHOTOGRAPHIC
OR CINEMATOGRAPHIC OBJECTIVES
Filed March 8, 1960   2 Sheets-Sheet 1

INVENTOR:
KarlHeinz Schütz
BY
Agent

Sept. 18, 1962 K. H. SCHÜTZ 3,054,336
EXPOSURE-CONTROL SYSTEM FOR PHOTOGRAPHIC
OR CINEMATOGRAPHIC OBJECTIVES
Filed March 8, 1960 2 Sheets-Sheet 2

INVENTOR:
KarlHeinz Schütz

BY

Karl F. Ross
Agent

United States Patent Office 3,054,336
Patented Sept. 18, 1962

3,054,336
EXPOSURE-CONTROL SYSTEM FOR PHOTO-GRAPHIC OR CINEMATOGRAPHIC OBJECTIVES
Karl Heinz Schütz, Bad Kreuznach, Germany, assignor to Jos. Schneider & Co., Optische Werke, Kreuznach, Rhineland, Germany, a corporation of Germany
Filed Mar. 8, 1960, Ser. No. 13,614
Claims priority, application Germany Mar. 14, 1959
9 Claims. (Cl. 95—10)

My present invention relates to optical objectives for photographic or cinematographic cameras provided with means for controlling the exposure by correlating the settings of their diaphragm and their shutter with each other in accordance with prevailing lighting conditions, preferably as determined by a photometric device.

It is an object of my present invention to provide simple means for insuring correct exposure through the adjustment of the shutter control or the diaphragm control, or the concurrent adjustment of both, in accordance with a particular setting determined photometrically or in some other manner.

It is another object of this invention to provide means for maintaining proper correlation between the two controls to insure correct exposure if, following the initial setting thereof, readjustment of either the shutter or the diaphragm should be desired.

A more particular object of this invention is to provide a photometric attachment for optical objectives having means to establish the desired correlation between the shutter and diaphragm controls in accordance with the measured light intensity.

A feature of my present invention resides in the provision of a pair of cams, respectively coupled with the shutter control and the diaphragm control of the objective, in combination with a differential cam follower actuated by these cams and coupled with an indicator member which may thus be given a predetermined setting by the displacement of either of these cams or by their concurrent displacement at different rates. The indicator may be in the form of a secondary pointer designed to register with a primary pointer in its proper position of adjustment, the primary pointer being part of a light-measuring device such as an electric photometer. The photometer and the differential follower are advantageously included in a removable attachment operatively positionable on the objective housing by a simple interlocking fit. The cams may in this case be a pair of co-axial rings or ring segments whose working surfaces, facing an entrance opening for the axial introduction of the differential follower (or parts thereof) into the objective housing, rise progressively in a direction parallel to the objective axis so as to describe a generally helicoidal path. The differential follower, which may be in the form of a rocker having opposite extremities in touch with the two cams, will remain stationary during simultaneous displacement of these cams if their helicoidal working surfaces are of constant and opposite pitch; if, then, the two cams are coupled together for rotation in unison, the setting of the follower indicator or secondary pointer will not be disturbed by an adjustment of the diaphragm control in, for example, an aperture-reducing sense accompanied by a compensating adjustment of the shutter control in, say, a time-increasing direction.

The invention will be described in greater detail with reference to the accompanying drawing in which.

Figure 1:
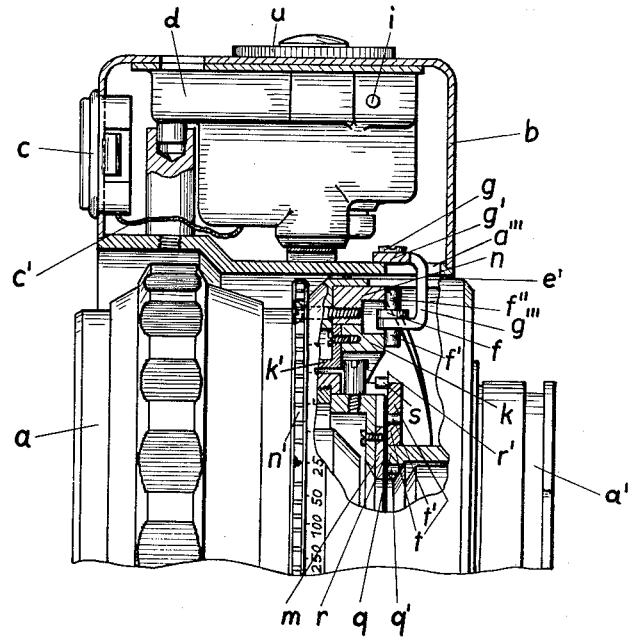
FIG. 1 is a side-elevational view, partly in section, of a camera objective provided with an attachment embodying the invention.

The system illustrated in the drawing comprises an objective housing $a$ provided with a bayonet coupling $a'$ for connecting it with the camera. Removably mounted on top of housing $a$ is an attachment $b$ comprising a photocell $c$ connected by wires $c'$ to a conventional photometric indicator device $d$. This device comprises a primary pointer $d'$, directly controlled by the photocell $c$, and a secondary or follower pointer $d''$ whose position is adjustable in a manner known per se with the aid of a laterally projecting stud $i$. The attachment $b$ is slidably fitted to the objective housing $a$ by means of tenons $e$, resting on it through the intermediary of resilient spacers $e'$, and may be locked to the housing by suitable fastening means not shwon.

A differential rocker $f$ is swingably carried on a bail $g'''$ which rigidly depends from a lever $g'$ horizontally swingable about a pivot $g$ within the attachment $b$. A bell-crank lever $g''$, pivoted to the attachment at $g^{IV}$, pivotally engages at $g^V$ the lever $g'$ and at $h'''$ another arm $h$ pivoted at $h'$ and provided with a curved spring $h''$ bearing on the lower casing part of device $d$ and tending to rotate the arm $h$ and, therefore, the arm $g'$ clockwise about their respective pivots $h'$ $g$ as viewed in FIG. 2.

Figure 3:
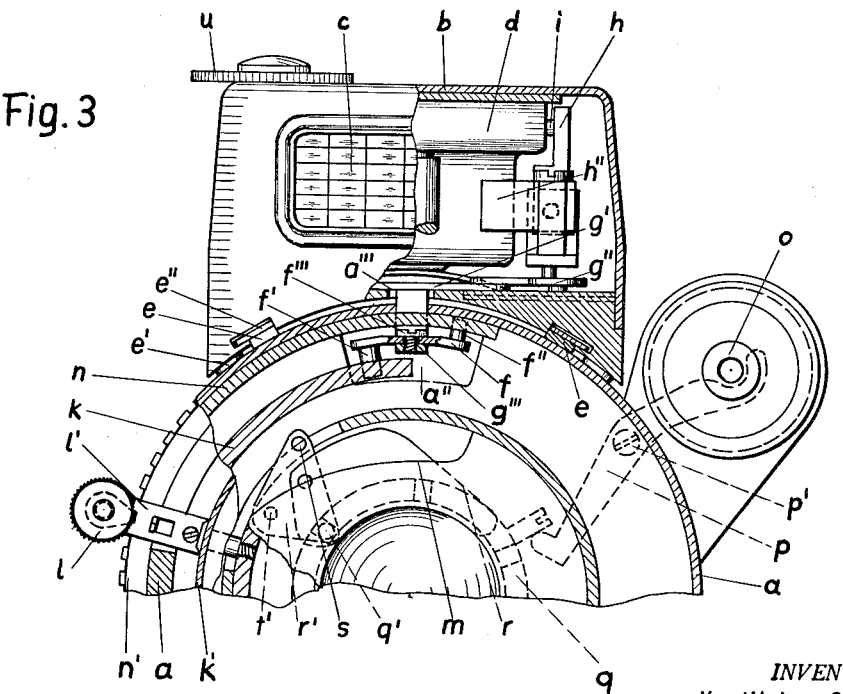
FIG. 3 is a partial front view (parts broken away) of the assembly shown in FIGS. 1 and 2.
Figure 2:
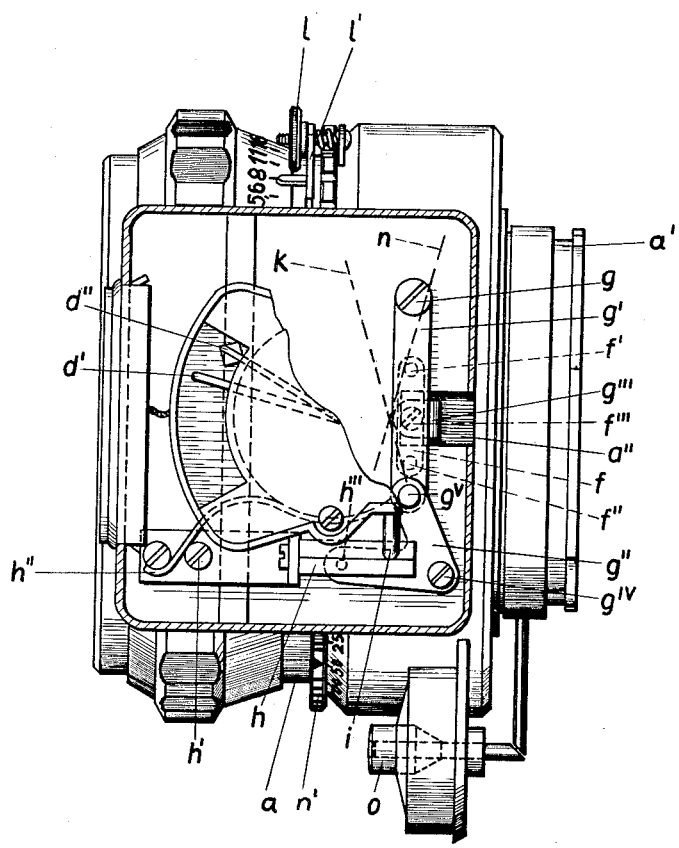
FIG. 2 is a top plan view (parts broken away) of the objective and its attachment.

The differential rocker $f$, whose pivot on bail $g'''$ is shown at $f'''$, is provided at its extremities with cam-riding pins $f'$, $f''$ abutting a pair of co-axial, helical cams $k$, $n$ with which they are brought into contact by the axial introduction of the rocker into the objective housing $a$ through an opening $a''$ (FIG. 3) as the tenons $e$ slide in their mortises $e''$. The opening $a''$ merges with a rearwardly open slot $a'''$ which extends in the axial direction of the housing $a$ to accommodate the bail $g'''$. The pins $f'$, $f''$ are urged against the working surfaces of these cams, whose relatively opposite inclination with respect to the objective axis is best seen in FIG. 2, by means of the spring $h''$ through the intermediary of the linkage $h$, $g''$ and $g'$. The upper edge of arm $h$ also bears upon the stud $i$ to vary the setting of secondary pointer $d''$ under the joint control of the cams $n$ and $k$. Inner cam $k$ is rotatably entrained by a ring $k'$ engaged, in turn, by a diaphragm-setting lever $l'$ bearing a knob $l$. Cam $n$ is rotatably coupled with a control ring $n'$ for the shutter speed. The two control members $l'$ and $n'$ are adapted to be clamped together for simultaneous rotation by means of the knob $l$.

The setting mechanism for the diaphragm, whose iris leaves have been indicated at $r$, may be of the general type described in my co-pending application Ser. No. 733,937, filed May 8, 1958, now Patent No. 2,981,169, issued Apr. 25, 1961, to enable preselection of a desired diaphragm opening to which the normally wide-open diaphragm aperture is reduced during actuation of the shutter. For this purpose there is provided a cam disk $m$ whose peripheral surface serves as a stop for a pin $s$ on an extension $r'$ of one of the iris leaves which is normally urged away from this surface by a spring (not shown) tending to impart clockwise rotation (as viewed in FIG. 3) to a grooved ring $q$ to which the leaves are anchored by means of pins $q'$ while being swingable about other pins $t'$ on a fixed ring $t$. Ring q is rotatable, against the force of its restoring spring, by an arm $p$ which is swingable about a pivot $p'$ under the control of a shutter-trip button $o$ in substantially the manner disclosed in my co-pending application Ser. No. 586,559, filed May 22, 1956, now Patent No. 2,966,105, issued Dec. 27, 1960. Button $o$, when depressed against the restoring action of its own spring (not shown) for the taking of a picture, cams aside the arm $p$ to rotate the ring $q$ counterclockwise to the extent permitted by the pin $s$ as it strikes the surface of cam disk $m$.

It will be apparent that a single photometric attachment $b$ may be interchangeably used with a variety of objectives, a knob $u$ being advantageously provided to permit relative readjustment of the pointers in a manner peculiar to each objective. Naturally, many structural modifications of the arrangement shown and described are possible; thus, for example, the rocker $f$ need not be introduced in its entirety into the objective housing but may only have its cam-contacting extremities so inserted. These and other modifications, believed to be readily apparent to persons skilled in the art, are intended to be embraced within the spirit and scope of my invention except as otherwise limited by the appended claims.

I claim:

1. In an optical objective provided with exposure-controlling means, in combination, an objective housing, guide means on said housing cam means in said housing coupled with said exposure-controlling means, an attachment removably positionable on said housing and movable along said guide means into an operative position on a predetermined path, said attachment being provided with photometric indicator means and with adjustable follower means, said cam means being displaceable by said exposure-controlling means in a plane generally transverse to said path, said housing having an opening giving access to said cam means, and cam-rider means on said attachment extending through said opening into engagement with said cam means upon operative positioning of said attachment on said housing, said cam-rider means being coupled with said follower means for displacing the latter to a position determined by said photometric indicator means through a corresponding adjustment of said exposure-controlling means.

2. The combination according to claim 1 wherein said exposure-controlling means comprises a shutter-control member and a diaphragm-control member, said cam means comprising a pair of independently movable cams respectively coupled with said members, said cam-rider means including a movable element and a rocker respectively contacting said cams at its extremities, said rocker being pivotally joined to said element for displacing the latter in accordance with the differential displacement of its pivot caused by the separate motions of said extremities.

3. The combination according to claim 2 wherein said control members are provided with coupling means adapted to synchronize their movements, said cams being provided with co-axial helicoidal working surfaces of opposite pitch maintaining said pivot substantially stationary upon synchronized movement of said members for mutually compensating adjustments of the diaphragm and the shutter controlled thereby.

4. In an optical objective provided with exposure-controlling means, in combination, an objective housing provided with an access opening including a slot, cam means in said housing rotatable about an axis and facing in the direction of said opening, said cam means being coupled with said exposure-controlling means, guide means on said housing paralleling said slot, an attachment removably positionable on said housing and slidable along said guide means into an operative position thereon, said attachment being provided with photometric indicator means and with adjustable follower means, and cam-rider means on said attachment extending through said slot into engagement with said cam means upon operative positioning of said attachment on said housing, said cam-rider means being coupled with said follower means for displacing the latter to a position determined by said indicator means through a corresponding adjustment of said exposure-controlling means, said cam-rider means being withdrawable from said housing by way of said opening upon removal of said attachment therefrom.

5. In an optical objective provided with exposure-controlling means, in combination, a generally cylindrical objective housing provided with an access opening including a slot extending in axial direction of said housing, cam means in said housing rotatable about the axis of said housing and facing in the direction of said opening, said cam means being coupled with said exposure-controlling means, guide means on said housing paralleling said slot, an attachment removably positionable on said housing and slidable along said guide means into an operative position thereon, said attachment being provided with photometric indicator means and with adjustable follower means, and cam-rider means on said attachment extending through said slot into engagement with said cam means upon operative positioning of said attachment on said housing, said cam rider means being coupled with said follower means for displacing the latter to a position determined by said indicator means through a corresponding adjustment of said exposure controlling means, said cam-rider means being withdrawable from said housing by way of said opening upon removal of said attachment therefrom.

6. In an optical objective provided with shutter-control and diaphragm-control means, in combination, an objective housing provided with an access opening including a slot, a pair of annular cams in said housing independently rotatable about an axis and facing in the direction of said opening, said cams being coupled with said shutter-control and diaphragm-control means, respectively, guide means on said housing paralleling said slot, an attachment removably positionable on said housing and slidable along said guide means into an operative position thereon, said attachment being provided with photometric indicator means and with adjustable follower means, and a pair of cam-rider members on said attachment extending through said slot into engagement with said cams, respectively, upon operative positioning of said attachment on said housing, said cam-rider members being differentially coupled with said follower means for displacing the latter to a position determined by said indicator means through a corresponding adjustment of at least one of said control means, said cam-rider members being withdrawable from said housing by way of said opening upon removal of said attachment therefrom.

7. In an optical objective provided with shutter-control and diaphragm-control means, in combination, a generally cylindrical objective housing provided with an access opening including a slot extending in axial direction of said housing, a pair of annular cams in said housing independently rotatable about the axis of said housing and facing in the direction of said opening, said cams being coupled with said shutter-control and diaphragm-control means, respectively, guide means on said housing paralleling said slot, an attachment removably positionable on said housing and slidable along said guide means into an operative position thereon, said attachment being provided with photometric indicator means and with adjustable follower means, and a pair of cam-rider members on said attachment extending through said slot into engagement with said cams, respectively, upon operative positioning of said attachment on said housing, said cam-rider members being differentially coupled with said follower means for displacing the latter to a position determined by said indicator means through a corresponding adjustment of at least one of said control means, said cam-rider members being withdrawable from said housing by way of said opening upon removal of said attachment therefrom.

8. In an optical objective provided with exposure-controlling means, in combination, a generally cylindrical objective housing, guide means on said housing, cam means in said housing coupled with said exposure-controlling means, an attachment removably positionable on said housing and movable along said guide means into an operative position on a predetermined path parallel to the axis of said housing, said housing having an opening giving access to said cam means, said attachment being provided with photometric indicator means and with adjustable follower means, said cam means being rotatable by said exposure-controlling means about the axis of said housing, and cam-rider means on said attachment extending through said opening into engagement with said cam means upon operative positioning of said attachment on said housing, said cam-rider means being coupled with said follower means for displacing the latter to a position determined by said indicator means through a corresponding adjustment of said exposure-controlling means.

9. In an optical objective provided with shutter-control and diaphragm-control means, in combination, a generally cylindrical objective housing, guide means on said housing, a pair of annular cams in said housing respectively coupled with said shutter-control and said diaphragm-control means, an attachment removably positionable on said housing and movable along said guide means into an operative position on a predetermined path parallel to the axis of said housing, said housing having an opening giving access to said cams, said attachment being provided with photometric indicator means and with adjustable follower means, said cams being independently rotatable by their respective control means about the axis of said housing, and a pair of cam-rider members on said attachment extending through said opening into engagement with said cams upon operative positioning of said attachment on said housing, said cam-rider members being differentially coupled with said follower means for displacing the latter to a position determined by said indicator means through a corresponding adjustment of at least one of said control means.

References Cited in the file of this patent

UNITED STATES PATENTS

| | | |
|---|---|---|
| 2,126,338 | Mihalyi | Aug. 9, 1938 |
| 2,845,013 | Schutz | July 29, 1958 |
| 2,887,026 | Rentschler | May 19, 1959 |
| 2,926,571 | Sommer | Mar. 1, 1960 |
| 2,932,242 | Greger | Apr. 12, 1960 |
| 2,935,920 | Rentschler | May 10, 1960 |